Patented Sept. 8, 1942

2,295,050

UNITED STATES PATENT OFFICE 2,295,050

AZO DYE

William B. Reynolds, Elmhurst, N. Y., Swanie S. Rossander, Wilmington, Del., and Donovan E. Kvalnes, Penns Grove, N. J., assignors to E. I. du Pont de Nemours & Company, Wilmington, Del., a corporation of Delaware No Drawing. Application April 13, 1940, Serial No. 329,490

3 Claims. (Cl. 260—160)

This invention relates to azo dyes which are particularly useful in the dyeing of wool and Nylon.

It is an object of the invention to prepare dyes which have good affinity, light fastness and wet fastness on wool and Nylon. It is well known in the industry that dyestuffs are selective in their dyeing properties, particular colors being required for application to wool and different colors being generally required for application to cotton. It is even believed by some authorities that the dyeing process on wool is different from that on cotton. Dyes which have been found to be of practical importance for wool are soluble in water due to the presence of sulfonic or carboxylic acid groups. It is generally believed that the dyeing of wool involves a chemical reaction between the acid groups of the dye molecule and the amino and amido groups present in the wool. Dyes of high molecular weight are not generally of high value for that purpose. The dyes which we have invented are of particular use for wool and Nylon.

We have discovered that dyes satisfactory for the dyeing of wool and Nylon can be made by coupling tetrazotized meta or para disulfanilamide with an azo dyestuff coupling component devoid of carboxylic or sulfonic acid groups Coupling components of particular use are phenols, naphthols, pyrazolones, dihydroxy quinolines, aceto acetanilides, and dihydro resorcins The coupling components may carry the usual substituent groups, such as alkyl, alkoxy, nitro, and amino.

The following examples illustrate the invention but do not limit it:

Example I 327 parts of para-disulfanilamide are added to 2000 parts of water and 182.5 parts of hydrogen chloride. The temperature of the mixture is lowered to 0-5° C. by the addition of ice. 138 parts of sodium nitrite, dissolved in 700 parts, are added stirring rapidly without loss due to nitrous fumes. When tetrazotization is complete, the tetrazo solution is added slowly to a solution of 348 parts of 1-phenyl-3-methyl-pyrazolone-5, 2000 parts of water, 80 parts of sodium hydroxide and 212 parts of sodium carbonate at 0-5° C. Coupling proceeds rapidly and after it is complete the yellow dye is filtered off and dried. It dyes wool and Nylon in yellow shades of very good fastness to light and good fastness to fulling.

Example II

If meta-disulfanilamide is used instead of the para-disulfanilamide of Example I, there is obtained a yellow product which dyes wool and Nylon in shades of yellow of good fastness properties.

Example III

If 216 parts of p-cresol are used instead of the 1-phenyl-3-methyl-pyrazolone-5, there is obtained a dye which gives yellow shades on Nylon of very good fastness to light.

The following examples show dyestuffs prepared in a manner similar to the foregoing which have excellent properties.

| Ex. | | | Shade |
|---|---|---|---|
| 4 | Para-disulfanilamide ⇒ | (phenol)₂ | Yellow. |
| 5 | Para-disulfanilamide ⇒ | (2,4-dihydroxy quinoline)₂ | Greenish yellow. |
| 6 | Para-disulfanilamide ⇒ | (beta naphthol)₂ | Red. |
| 7 | Para-disulfanilamide ⇒ | (acetoacetanilide)₂ | Greenish yellow. |
| 8 | Para-disulfanilamide ⇒ | (1-(3' nitro phenyl)-3-methyl-pyrazolone-5)₂ | Yellow. |
| 9 | Para-disulfanilamide ⇒ | (1-(4' nitro phenyl)-3-methyl-pyrazolone-5)₂ | Do. |
| 10 | Para-disulfanilamide ⇒ | (1-phenyl-5-pyrazolone-3-carboxylic acid ethyl ester)₂ | Do. |
| 11 | Meta-disulfanilamide ⇒ | (phenol)₂ | Do. |

Illustrative of the many coupling components which can be used are the following: phenol, o-m- and p-cresol; 3-methoxy phenol; 2,4-dimethyl phenol; 3,5-dimethyl phenol; 3-methyl-4-chlor phenol; N-acetyl m-amino phenol; resorcin; a-naphthol; b-naphthol; 1-phenyl-3-methyl-5-pyrazolone; 1-(m- and p-nitro phenyl); 3-methyl-5-pyrazolone; 1-m-tolyl-phenyl-3-methyl-5-pyrazolone; 2,4-dihydroxy quinoline; dimethyl dihydro resorcin; acetoacetanilide and the acetoacetanilides of such aniline derivatives as the following: o- and p-toluidine, o- m- and p-chloraniline, 2,4-dimethyl aniline, o- and p-phenetidine; o- and p-anisidine.

As many apparently widely different embodiments of this invention may be made without departing from the spirit and scope thereof, it is to be understood that we do not limit ourselves to the specific embodiments thereof except as defined in the appended claims.

We claim:

1. The disazo dye prepared by coupling disulfanilamide tetrazo with two moles of phenyl methyl pyrazolone.

2. The disazo dye prepared by coupling disulfanilamide tetrazo with two moles of p-cresol.

3. A material of the class consisting of wool and Nylon dyed with a compound free from metals and represented by the formula:

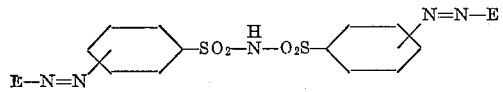

in which the inner nuclei are free from groups capable of forming a metal complex, E represents a coupling component in meta or para position free from sulfonic and carboxy groups from the class consisting of phenols, naphthols, pyrazolones, dihydroxy quinolines, acetoacetanilides, and dihydro resorcins.

WILLIAM B. REYNOLDS.
SWANIE S. ROSSANDER.
DONOVAN E. KVALNES.